United States Patent
Qiu et al.

(10) Patent No.: US 10,288,429 B2
(45) Date of Patent: May 14, 2019

(54) APPARATUS AND METHOD FOR DIMINISHING MODE LOCK INDUCED ERROR IN STIMULATED BRILLOUIN SCATTERING WAVEGUIDE RING LASER GYROSCOPES

(71) Applicant: Honeywell International Inc., Morris Plains, NJ (US)

(72) Inventors: Tiequn Qiu, Glendale, AZ (US); Jianfeng Wu, Tucson, AZ (US); Matthew Wade Puckett, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 169 days.

(21) Appl. No.: 15/611,742

(22) Filed: Jun. 1, 2017

(65) Prior Publication Data

US 2019/0017824 A1    Jan. 17, 2019

(51) Int. Cl.
| | |
|---|---|
| *G01C 19/68* | (2006.01) |
| *H01S 3/30* | (2006.01) |
| *G01C 19/66* | (2006.01) |
| *H01S 3/102* | (2006.01) |

(52) U.S. Cl.
CPC .......... *G01C 19/68* (2013.01); *G01C 19/662* (2013.01); *G01C 19/667* (2013.01); *H01S 3/1024* (2013.01); *H01S 3/302* (2013.01)

(58) Field of Classification Search
CPC ...... G01C 19/68; G01C 19/70; G01C 19/662; G01C 19/66; G01C 19/64
See application file for complete search history.

(56) References Cited

U.S. PATENT DOCUMENTS

| | | | |
|---|---|---|---|
| 3,627,422 | A | 12/1971 | Marvin |
| 4,159,178 | A | 6/1979 | Vali et al. |
| 4,396,290 | A | 8/1983 | Morris |
| 4,863,272 | A | 9/1989 | Coccoli |

(Continued)

FOREIGN PATENT DOCUMENTS

| | | |
|---|---|---|
| DE | 2907703 A1 | 9/1980 |
| WO | 2010009951 | 1/2010 |

OTHER PUBLICATIONS

European Patent Office, "Extended European Search Report from EP Application No. 18164443.6 dated Oct. 19, 2018", "from Foreign Counterpart of U.S. Appl. No. 15/611,742", filed Oct. 19, 2018, p. 1-10, published in EP.

(Continued)

*Primary Examiner* — Michael P LaPage
(74) *Attorney, Agent, or Firm* — Fogg & Powers LLC

(57) ABSTRACT

In one embodiment, a method is provided. The method comprises transmitting a first laser pump signal to an optical resonator; adjusting a frequency of the first laser pump signal; generating a first order Stokes signal from the first laser pump signal in an optical resonator; measuring a first beat signal frequency; ceasing transmission of the first laser pump signal to the optical resonator; transmitting a second laser pump signal to the optical resonator; adjusting a frequency of the second laser pump signal; generating a first order Stokes signal from the second laser pump signal in the optical resonator; and measuring a second beat signal frequency; ceasing transmission of the second laser pump signal to the optical resonator.

13 Claims, 7 Drawing Sheets

(56) References Cited

U.S. PATENT DOCUMENTS

| | | | |
|---|---|---|---|
| 4,922,481 A | | 5/1990 | Hicks |
| 5,064,288 A | | 11/1991 | Dyes et al. |
| 5,090,812 A | * | 2/1992 | Jungwirth ............... G01C 19/68 356/445 |
| 5,323,415 A | | 6/1994 | Quast et al. |
| 5,351,252 A | | 9/1994 | Toyama et al. |
| 5,406,370 A | | 4/1995 | Huang et al. |
| 5,408,317 A | | 4/1995 | Dyes et al. |
| 5,517,305 A | | 5/1996 | Raab |
| 5,537,671 A | | 7/1996 | Toyama et al. |
| 6,424,664 B1 | | 7/2002 | Oh et al. |
| 7,024,069 B2 | | 4/2006 | Savchenkov et al. |
| 7,065,276 B2 | | 6/2006 | Scheuer et al. |
| 7,184,624 B1 | | 2/2007 | Matsko et al. |
| 7,372,574 B2 | | 5/2008 | Sanders et al. |
| 7,463,360 B2 | | 12/2008 | Hughes et al. |
| 8,289,616 B1 | | 10/2012 | Maleki et al. |
| 8,659,760 B2 | | 2/2014 | Sanders et al. |
| 8,830,478 B2 | | 9/2014 | Wu et al. |
| 9,001,336 B1 | * | 4/2015 | Qiu ....................... G01C 19/727 356/461 |
| 9,459,101 B1 | * | 10/2016 | Strandjord ............. G01C 19/72 |
| 9,537,283 B2 | | 1/2017 | Strandjord et al. |
| 9,581,448 B2 | | 2/2017 | Christensen et al. |
| 2011/0255094 A1 | | 10/2011 | Mohageg et al. |
| 2012/0189025 A1 | | 7/2012 | Zheng et al. |
| 2013/0107271 A1 | * | 5/2013 | Strandjord ........... G01C 19/727 356/461 |
| 2014/0152994 A1 | | 6/2014 | Wu et al. |
| 2015/0260520 A1 | * | 9/2015 | Qiu ....................... G01C 19/721 356/461 |
| 2017/0067743 A1 | | 3/2017 | Salit et al. |

OTHER PUBLICATIONS

European Patent Office, "Office Action from EP Application No. 13191290.9 dated Feb. 21, 2014", "from Foreign Counterpart of U.S. Appl. No. 13/693,321", filed Feb. 21, 2014, pp. 1-6, Published in: EP.

European Patent Office, "Extended Search Report for EP Application No. 16187068.8 dated Jan. 23, 2017", "From Foreign Counterpart to U.S. Appl. No. 14/882,101", filed Jan. 23, 2017, pp. 1-8, Published in: EP.

United States Patent and Trademark Office, "Notice of Allowance", "From U.S. Appl. No. 14/882,101", dated Apr. 11, 2017, pp. 1-31, Published in: US.

Abd-Rahman et al., "Multiwavelength, bidirectional operation of twin-cavity Brillouin/erbium fiber laser", "Optics Communications 181", Jul. 1, 2000, pp. 135-139, Publisher: Elsevier Science B.V.

Chen, Shiyi, "Stimulated Brillouin Scattering in an On-Chip Microdisk Resonator—Abstract", Dec. 2014, Publisher: University of Illinois at Urbana-Champaign.

Hitz, "Silicon Raman Laser Cascades Toward Mid-IR Spectral Region", "Nature Photonics", Mar. 2008, pp. 170-174.

Kim et al., "Non-reciprocal Brillouin Scattering Induced Transparency", "Nature Physics", Jan. 26, 2015, pp. 275-280, vol. 11.

Li et al., "Microresonator Brillouin Gyroscope", "Optical Society of America", 2015, pp. 1-2, Publisher: https://www.osapublishing.org/abstract.cfm?URI=nlo-2015-NTh3A.2.

Matsko et al., "Optical resonators with whispering gallery modes I: Basics", "IEEE JSTQE", Jan.-Feb. 2006, pp. 3-14, vol. 12, No. 1.

Nicati et al., "Frequency Stability of a Brillouin Fiber Ring Laser", "Journal of Lightwave Technology", Jul. 1, 1995, pp. 1445-1451, vol. 13, No. 7, Published in: US.

Nicati et al., "Frequency Pulling in a Brillouin Fiber Ring Laser", "IEEE Photonics Technology Letters", Jul. 1994, pp. 801-803, vol. 6, No. 7, Publisher: IEEE.

Pant et al., "On-Chip Stimulated Brillouin Scattering", "Optics Express", Apr. 25, 2011, pp. 8285-8290, vol. 19, No. 9.

Pant et al., "On-chip Stimulated Brillouin Scattering for Microwave Signal Processing and Generation", "Laser & Photonics Reviews", 2014, pp. 653-666, vol. 8, No. 5.

Slagmolen, "Phase-Sensitive Reflection Technique for Characterization of a Fabry-Perot Interferometer", "Applied Optics", Jul. 20, 2000, pp. 3638-3643, vol. 39, No. 21, Publisher: Optical Society of America.

Takesue et al., "An On-Chip Coupled Resonator Optical Waveguide Single-Photon Buffer", "Nature Communications", Nov. 12, 2013, pp. 1-11.

Wu et al., "Systems and Methods for an Optical Frequency Comb Stimulated Brillouin Scattering Gyroscope With Rigid Optical Waveguide Resonator", "U.S. Appl. No. 14/680,331, filed Apr. 7, 2015", filed Apr. 7, 2015.

Salit et al., "Single-Pump Cascaded Stimulated Beillouin Scattering (SBS) Ring Laser Gyro", "U.S. Appl. No. 14/882,101, filed Oct. 13, 2015", Oct. 13, 2015, pp. 1-37, Published in: US.

Yariv, "Critical Coupling and Its Control in Optical Waveguide-Ring Resonator Systems", "IEEE Photonics Technology Letters, Apr. 2002",, pp. 483-485, vol. 14, No. 4.

Zarinetchi et al., "Stimulated Brillouin fiber-optic laser gyroscope", "Optics Letters", Feb. 15, 1991, pp. 229-231, vol. 16, No. 4, Publisher: Optical Society of America, Published in: New York, NY.

Salit et al., "Stimulated Brillouin Scattering (SBS) Gyro With Coupled Resonator for Frequency-Dependent Output Coupling", "U.S. Appl. No. 15/052,490, filed Feb. 24, 2016", Feb. 24, 2016, pp. 1-45, Published in: US.

* cited by examiner

APPARATUS AND METHOD FOR DIMINISHING MODE LOCK INDUCED ERROR IN STIMULATED BRILLOUIN SCATTERING WAVEGUIDE RING LASER GYROSCOPES

STATEMENT REGARDING FEDERALLY SPONSORED RESEARCH OR DEVELOPMENT

This invention was made with Government support under N66001-16-C-4017 awarded by SPAWAR Systems Center Pacific. The Government has certain rights in the invention. This material is based upon work supported by the Defense Advanced Research Projects Agency (DARPA) and Space and Naval Warfare Systems Center Pacific (SSC Pacific).

BACKGROUND

Stimulated Brillouin scattering (SBS) generates Stokes signals having very low phase noise. This is desirable for ring laser gyroscopes, because reduction of signal phase noise increases rotation measurement accuracy. A ring may be circular, triangular or any other closed perimeter geometry.

Typically, two optical signals, from two corresponding lasers are injected respectively clockwise and counter clockwise into a waveguide resonator. Stimulated Brillouin scattering in the resonator generates, respectively counter clockwise and clockwise at least first order, or first, Stokes signals. The term Nth order Stokes signal and Nth Stokes signal are interchangeable; Nth can be first, second, etc.

However, the counter clockwise and clockwise first order Stokes signals are susceptible to coupling due to backscattering in the waveguide. As a result, the counter clockwise and clockwise first order Stokes signals may become mode locked, thus having the same frequency. As a result, the SBS ring laser gyroscope can no longer determine angular rotation. Therefore, there is a need to diminish or eliminate such mode locking effect.

SUMMARY

In one embodiment, a method is provided. The method comprises transmitting a first laser pump signal to an optical resonator; adjusting a frequency of the first laser pump signal; generating a first order Stokes signal from the first laser pump signal in an optical resonator; measuring a first beat signal frequency; ceasing transmission of the first laser pump signal to the optical resonator; transmitting a second laser pump signal to the optical resonator; adjusting a frequency of the second laser pump signal; generating a first order Stokes signal from the second laser pump signal in the optical resonator; and measuring a second beat signal frequency; ceasing transmission of the second laser pump signal to the optical resonator.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
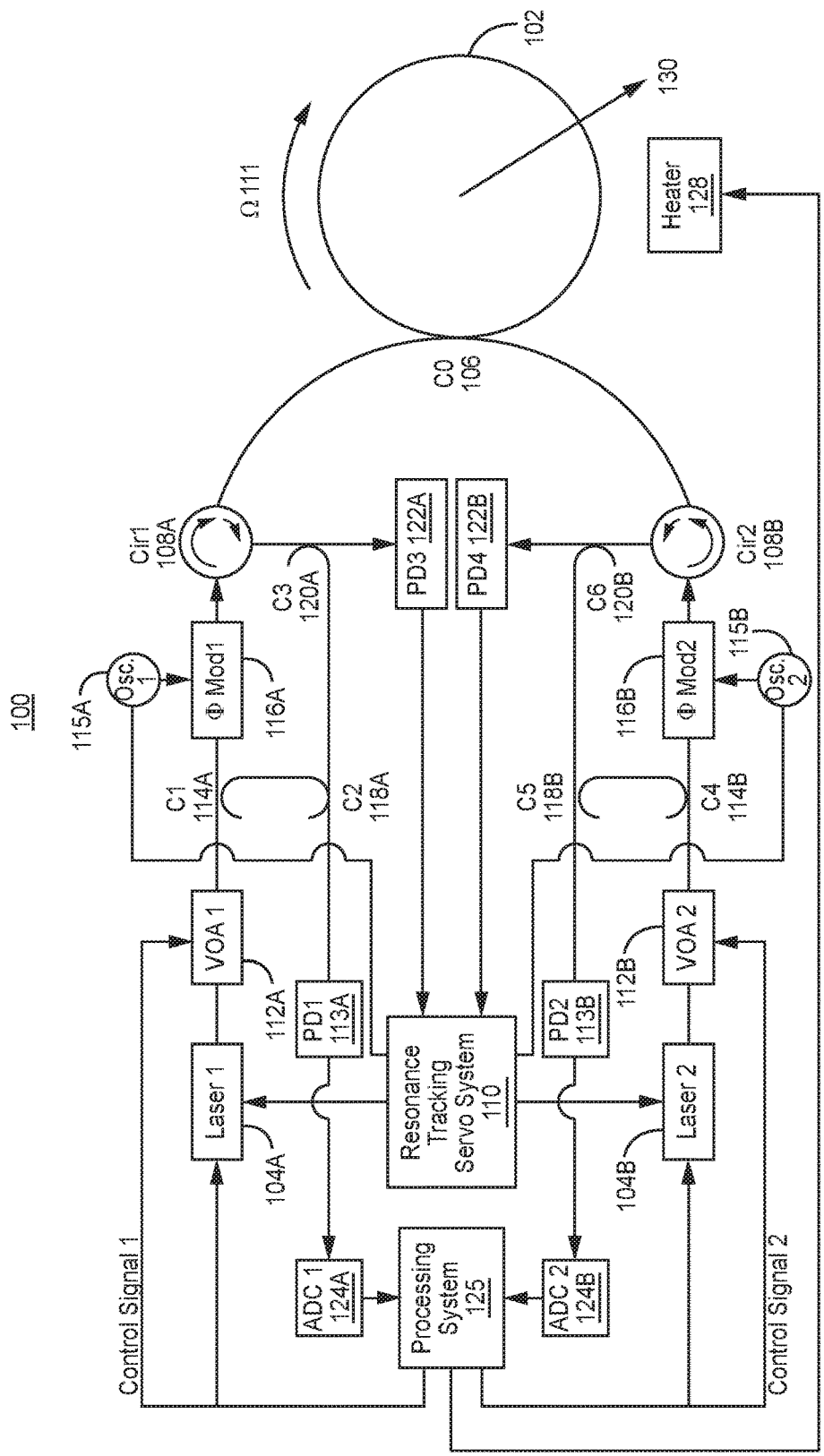
FIG. 1A illustrates one embodiment of a stimulated Brillouin scattering ring laser gyroscope with time division multiplexed lasers.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A stimulated Brillouin scattering (SBS) ring laser gyroscope with time division multiplexed lasers may be used to overcome the above referenced problem. FIG. 1A illustrates one embodiment of a SBS ring laser gyroscope with time division multiplexed lasers 100. The SBS ring laser gyroscope with time division multiplexed lasers 100 includes an optical resonator 102, and is used to measure angular rotation ($\Omega$) 111 around an input axis 130 of the optical resonator 102.

The SBS ring laser gyroscope with time division multiplexed lasers 100 illustrated in FIG. 1A is one example of how to construct such a gyroscope. As is further illustrated below, other combinations of optical components may be used to implement the SBS ring laser gyroscope with time division multiplexed lasers.

The SBS ring laser gyroscope with time division multiplexed lasers 100 includes a first laser 104A and a second laser 104B. The first laser 104A includes a first input that is coupled to a first output of a resonance tracking servo system 110, and an output coupled to an input of a first variable optical attenuator 112A. The second laser 104B includes a first input that is coupled to a second output of a resonance tracking servo system 110, and an output coupled to an input of a second variable optical attenuator 112B. In one embodiment, the first laser 104A and the second laser 104B each have a second input configured to be coupled to output(s) of a processing system 125.

In one embodiment, each variable optical attenuator has only maximum and minimum attenuation settings (respectively passing and blocking an optical signal, e.g. 'on' and 'off'). In another embodiment, each variable optical attenuator has incremental attenuation settings.

In one embodiment, the resonance tracking servo system 110 includes PDH feedback control electronics, a subtractor, and an integrator as is illustrated in U.S. Pat. No. 9,537,283, which is hereby incorporated by reference in its entirety. The resonance tracking servo system 110 is respectively part of a first Pound-Drever-Hall servo loop and a second Pound-Drever-Hall servo loop which are subsequently described in more detail.

A control input of the first variable optical attenuator 112A is coupled to a processing system 125. An output of the first variable optical attenuator 112A is coupled to a first port of a first optical coupler (C1) 114A. A control input of the second variable optical attenuator 112B is coupled to the processing system 125. An output of the second variable optical attenuator 112B is coupled to a first port of a fourth optical coupler (C4) 114B.

A second port of the first optical coupler 114A is coupled to a first input of a first phase modulator (Φ Mod 1) 116A. A third port of the first optical coupler 114A is coupled to a first port of a second coupler (C2) 118A. A second port of the fourth optical coupler 114B is coupled to a first input of a second phase modulator (Φ Mod 2) 116B. A third port of the fourth optical coupler 114B is coupled to a first port of a fifth coupler (C5) 118B.

A first oscillator (Osc. 1) 115A is coupled to a second input of the first phase modulator 116A. A second oscillator (Osc. 2) 115B is coupled to a second input of the second phase modulator 116B. The first oscillator and the second oscillator are coupled to, and their frequencies are controlled by, the resonance tracking servo system 110. In one embodiment, each of the first oscillator 115A and the second oscillator 115B are signal generators configured to generate sinusoidal signals at a single frequency, e.g. within a range of one kHz to five GHz. As will be further described below, the first oscillator 115A, the first phase modulator 116A, and the resonance tracking servo system 110 form part of the first Pound-Drever-Hall servo loop; the second oscillator 115B, the second phase modulator 116B, and the resonance tracking servo system 110 form part of the second Pound-Drever-Hall servo loop An output of the first phase modulator 116A is coupled to a first port of a first optical circulator (Cir1) 108A. An output of the second phase modulator 116B is coupled to a first port of a second optical circulator (Cir2) 108B. A second port and a third port of the first optical circulator 108A are respectively coupled to a first port of a resonator optical coupler (C0) 106 and a first port of a third optical coupler (C3) 120A. The first circulator 108A directs light from the first port to the second port of the first circulator 108A, so that light generated from the first laser 104A is injected to the optical resonator 102 in the counter-clockwise direction. A second port and a third port of the second optical circulator 108B are respectively coupled to a second port of the resonator optical coupler 106 and a first port of a sixth optical coupler (C6) 120B. The second circulator 108B directs light from the first port to the second port of the second circulator 108B, so that light generated from the second laser 104B is injected to the optical resonator 102 in the clockwise direction.

A third port and a fourth port of the resonator optical coupler 106 are respectively coupled to a first port and a second port of an optical waveguide forming an optical resonator 102 in the shape of a ring. In one embodiment, the optical waveguide is a coil of optical fiber (coil). However, in other embodiments, different waveguides, e.g. made from silicon nitride for example by semiconductor processing techniques, and different geometries can be used.

The first order Stokes signal generated in the optical resonator 102 by the pump signal from the first laser 104A propagates in the clockwise direction of the resonator 102. This first order Stokes signal is coupled out of the resonator 102 at the first port of the resonator coupler 106 and propagates from the second port of the first circulator 108A to its third port, and is coupled to the first port of the third optical coupler 120A. A second port and a third port of the third optical coupler 120A are respectively coupled to an input of a first photodetector (PD1) 113A (e.g. through second and third ports of the second optical coupler 118A which combines the pump signal from the first laser 104A with the corresponding first order Stokes signal), and an input of a third photodetector (PD3) 122A. The first order Stokes signal generated in the optical resonator 102 by the pump signal from the second laser 104B propagates in the counter-clockwise direction of the resonator 102. This first order Stokes signal is coupled out of the resonator 102 at the second port of the resonator coupler 106, and propagates from the second port of the second circulator 108B to the third port and is coupled to the first port of the sixth optical coupler 120B. A second port and a third port of the sixth optical coupler 120B are respectively coupled to an input of a second photodetector (PD2) 113B (e.g. through second and third ports of the fifth optical coupler 118B which combines the pump signal from the second laser 104B with the corresponding first order Stokes signal), and an input of a fourth photodetector (PD4) 122B.

The outputs of the third photodetector 122A and the fourth photodetector 122B are respectively coupled to a first input and a second input of the resonance tracking servo system 110. The outputs of the first photodetector 113A (which provides a signal having a beat frequency of the pump signal of the first laser 104A and the corresponding first order Stokes signal) and the second photodetector 113B (provides a signal having a beat frequency of the pump signal of the second laser 104B and the corresponding first order Stokes signal) are respectively coupled to inputs of a first analog to digital converter 124A and a second analog to digital converter 124B. Outputs of the first analog to digital converter 124A and the second analog to digital converter 124B are coupled to the processing system 125.

The processing system 125 is also coupled to, and configured to control the attenuation levels of, the first variable optical attenuator 112A and the second variable optical attenuator 112B. In one embodiment, the processing system 125 controls the power levels of the pump signals of the first laser 104A and the second laser 104B delivered to the optical resonator 102. In another embodiment, this is accomplished by having the processing system 125 configured to be coupled to and to control the power levels of the first laser 304A and the second laser 304B, e.g. by controlling current levels provided to each laser. In a further embodiment, this is accomplished by the processing system 125 controlling the attenuation level of the variable optical attenuator corresponding to the laser whose power level is to be controlled. In yet another embodiment, one or both of these techniques can be used to control the power levels of the pump signals of the first laser 104A and the second laser 104B delivered to the optical resonator 102.

In one embodiment, a heater 128 is thermally coupled to the optical resonator 102. In another embodiment, the heater 128 is coupled to the processing system 125 which can activate and deactivate the heater 128, and adjust the temperature of the heater 128. In a further embodiment, the heater 128 is used to heat the optical resonator 102, and thus adjust the resonance frequency of the optical resonator 102, e.g. so that it is closer to the frequencies of the pump signals emitted by the first laser 104A and the second laser 104B.

In one embodiment, the processing system 125 is configured to generate a signal, representative of the angular rotation rate (Ω) 111, around an input axis 130 of the optical resonator 102. The input axis 130 is parallel to the center axis of the optical resonator 102, e.g. the coil. In another embodiment, the input axis 130 is a centerline through the optical resonator 102, e.g. the coil. However, this is just one example. The input axis 130 need not be the centerline through the optical resonator 102, e.g. the coil.

FIG. 1A illustrates just one example of a combination of optical couplers and/or circulators that can be used implement an SBS ring laser gyroscope. For example, the SBS ring laser gyroscope can be implemented without the use of optical circulators. Thus, for example, a second optical resonator coupler can be coupled to the side of the optical resonator 102, opposite the optical resonator coupler 106, in lieu of the optical circulators. The second optical resonator coupler would also be coupled to the third optical coupler 120A and the sixth optical coupler 120B to provide output signals, Stokes and laser pump signals, to the first photodetector 113A, the second photodetector 113B, the third photodetector 122A, and the fourth photodetector 122B.

Figure 1B:
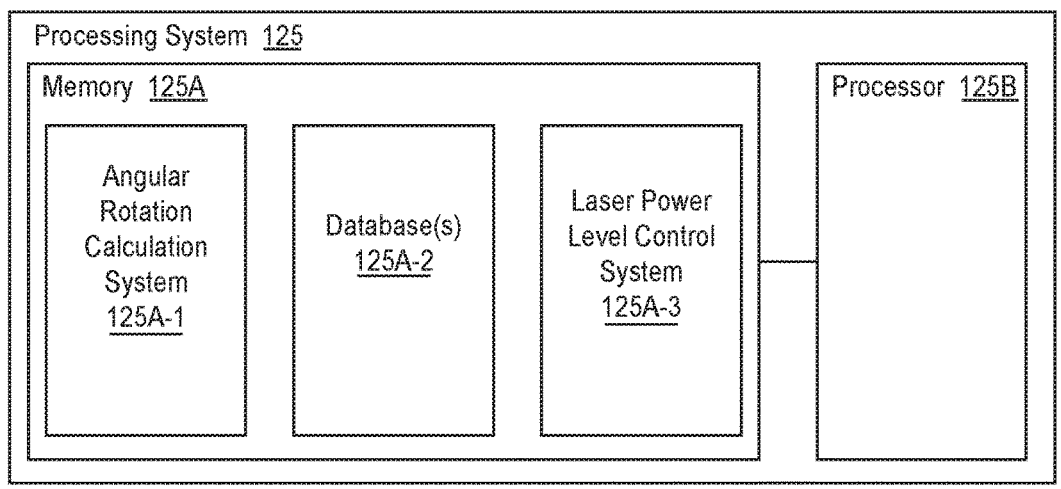
FIG. 1B illustrates one embodiment of a processing system.

FIG. 1B illustrates one embodiment of a processing system 125. The processing system 125 includes a memory 125A coupled to a processor 125B. The memory 125A includes an angular rotation calculation system 125A-1, at least one database 125A-2. In another embodiment, the memory 125A includes a laser power level control system 125A-3 which controls the output power of the first laser 104A and the second laser 104B as is further described below. The processor 125B may comprise in part or in whole a state machine or a field programmable gate array. In a further embodiment, the processing system 125 may be located elsewhere, in whole or in part, other than in or as part of the SBS ring laser gyroscope with time division multiplexed lasers 100.

The at least one database 125A-2 is any means of storing data including database(s), data file(s), and/or data register(s). In one embodiment, the at least one database 125A-2 stores beat signal data, e.g. taken at successive time intervals as discussed further below.

In one embodiment, the angular rotation calculation system 125A-1 determines a frequency component $\Delta f_R$ corresponding to the rate of angular rotation around the input axis 130 of the SBS ring laser gyroscope with time division multiplexed lasers 100. In another embodiment, successive beat signal frequency data (corresponding to frequency differences of a first laser pump signal and a corresponding first order Stokes signal, and a second laser pump signal and a corresponding first order Stokes signal) is determined, and stored by the processing system 125, for two successive time intervals. In a further embodiment, the angular rotation calculation system 125A-1 includes at least one discrete Fourier transform algorithm, such as a fast Fourier transform algorithm, to determine the beat signals' frequencies. The difference of the two successively measured beat signals is twice the frequency component $\Delta f_R$ corresponding to the rate of angular rotation. Thus, the frequency component $\Delta f_R$ is determined by dividing the difference by two. In yet another embodiment, the angular rotation calculation system 125A-1 determines the angular rotation rate (Ω) 111 which is equal to $(\eta*\lambda*\Delta f_R*P)/(4*A)$, where λ is substantially equal to the average wavelength of the first laser pump signal and the second laser pump signal, P is the length of the perimeter of the optical resonator 102 (e.g. the coil), e.g. the coil, A is the area enclosed by the optical resonator 102 (e.g. the coil), and n is the refraction index of the optical resonator 102.

In one embodiment, the laser power level control system 125A-3 serves as portions of feedback loops respectively to the first laser 104A and the second laser 104B. The laser power level control system 125A-3, in conjunction with the first photodetector 313A and the second photodetector 313B detects the presence of second order Stokes signal(s) generated in the optical resonator 102 individually by pump signals respectively of the first laser 104A and the second laser 104B. The laser power level control system 125A-3 generates control signals configured to be received by, and to regulate, e.g. diminish, the power levels of, such lasers to minimize the amplitude levels of the corresponding second order Stokes signal(s).

Figure 1C:
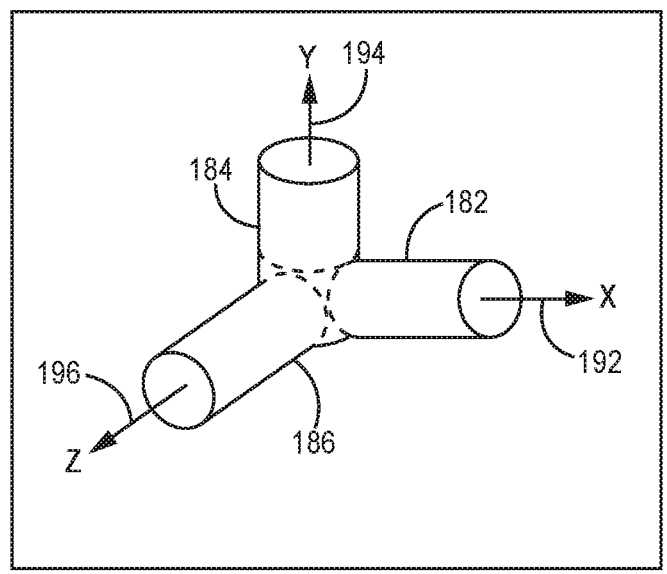
FIG. 1C illustrates one embodiment of a vehicle incorporating at least one stimulated Brillouin scattering ring laser gyroscope with time division multiplexed lasers.

FIG. 1C illustrates one embodiment of a vehicle 180 incorporating at least one SBS ring laser gyroscope with time division multiplexed lasers 100. The vehicle can be an aircraft, spacecraft, rocket, missile, land vehicle, space craft, water vehicle, or any other type of vehicle. In one embodiment, the vehicle incorporates at least one SBS ring laser gyroscope with time division multiplexed lasers 100. For example, as illustrated in FIG. 1C, the vehicle 180 incorporates three SBS ring laser gyroscopes with time division multiplexed lasers 182, 184, 186, respectively for an x-axis 192, y-axis 194 and z-axis 196. Thus, the vehicle 180 can determine angular rotation around each of the x-axis 192, y-axis 194 and z-axis 196.

As will be further subsequently illustrated in more detail, the operation of the exemplary SBS ring laser gyroscope with time division multiplexed lasers 100 will now be explained. The first laser 104A and the second laser 104B respectively generate a first laser pump signal and a second laser pump signal. The first laser pump signal and the second laser pump signal respectively propagate counter-clockwise and clockwise around the optical resonator 102.

Due to stimulated Brillouin scattering in the optical resonator 102, the first laser pump signal and the second laser pump signal, if there power levels are high enough, each respectively generate a first laser first Stokes signal and a second laser first Stokes signal. Additional higher order Stokes signals can also be generated if the power levels are even higher. The number of (e.g. first order, second order, etc.) Stokes signals generated depends upon pump signal power level in the optical resonator 102.

Odd order Stokes signals propagate in the opposite direction of the pump signal. Even order Stokes signal propagate in the same direction as the pump signal.

In an SBS ring laser gyroscope that measures the beat frequency between pump signal and the first order Stokes light to find rotation rate, second and higher order Stokes light are undesirable because they generate other beat frequencies that makes the measurement more complicated. Frequency pulling is another undesirable effect in a SBS ring laser gyroscope. Due to the misalignment of a cold optical resonator resonance frequency (i.e. the resonant frequency of the optical resonator 102 when no signals propagate in the optical resonator 102) with respect to a center frequency of the first Stokes gain center or region, the Stokes signal is pulled away from the resonance of the optical resonator 102. As a result, frequency pulling creates a bias error and diminishes the accuracy of the SBS ring laser gyroscope. The frequency pulling effect is minimized when pump signal power levels in the optical resonator 102 of the first laser 104A and the second laser 104B are maintained at laser threshold level(s), or at least one laser threshold level, where the second order Stokes signal is created. The laser threshold levels for the first laser 104A and the second laser 104B may be the same or different.

In one embodiment, such frequency pulling and higher order Stokes signals are avoided by setting the output power levels of the first laser 104A and the second laser 104B to a level that minimizes such pulling, i.e. at the laser threshold level(s) where the second order Stokes signals are created. In another embodiment, this output power level for the first laser 104A and the second laser 104B is four times the respective threshold power level that initially generates corresponding first order Stokes signal. In a further embodiment, as described above, this is accomplished by setting the output power levels of the first laser 104A and the second laser 104B in the optical resonator 102 to such laser threshold level(s) using the feedback loops including laser power level control system 125A-3, and the first photodetector 313A and the second photodetector 313B. Thus, with appropriate output power levels for the first laser 104A and the second laser 104B, higher order Stokes signals and frequency pulling are avoided.

Each of the respective first order Stokes signals propagate in the opposite direction, around the optical resonator 102, from the laser pump signal that generated them. Thus, in FIG. 1A, the first laser first order Stokes signal propagates clockwise. Correspondingly, the second laser first order Stokes signal propagates counter-clockwise.

However, if the first laser first order Stokes signal and the second laser first order Stokes signal simultaneously propagate in the optical resonator 102, they can 'mode lock' on one another having the same frequency regardless of SBS ring laser gyroscope rotation rate. If mode locking occurs, then the SBS ring laser gyroscope no longer can measure rotation rate.

To avoid mode locking, the first laser pump signal and the second laser pump signal are time division multiplexed. Thus, the first laser pump signal and the second laser pump signal are not substantially simultaneously transmitted but rather transmitted substantially alternatively. That is, the first laser pump signal and the second laser pump signal are transmitted using time division multiplexing. In one embodiment, there can be a short but finite overlap between the emissions of the first laser pump signal and the second laser pump signal into the optical resonator 102.

Figure 2:
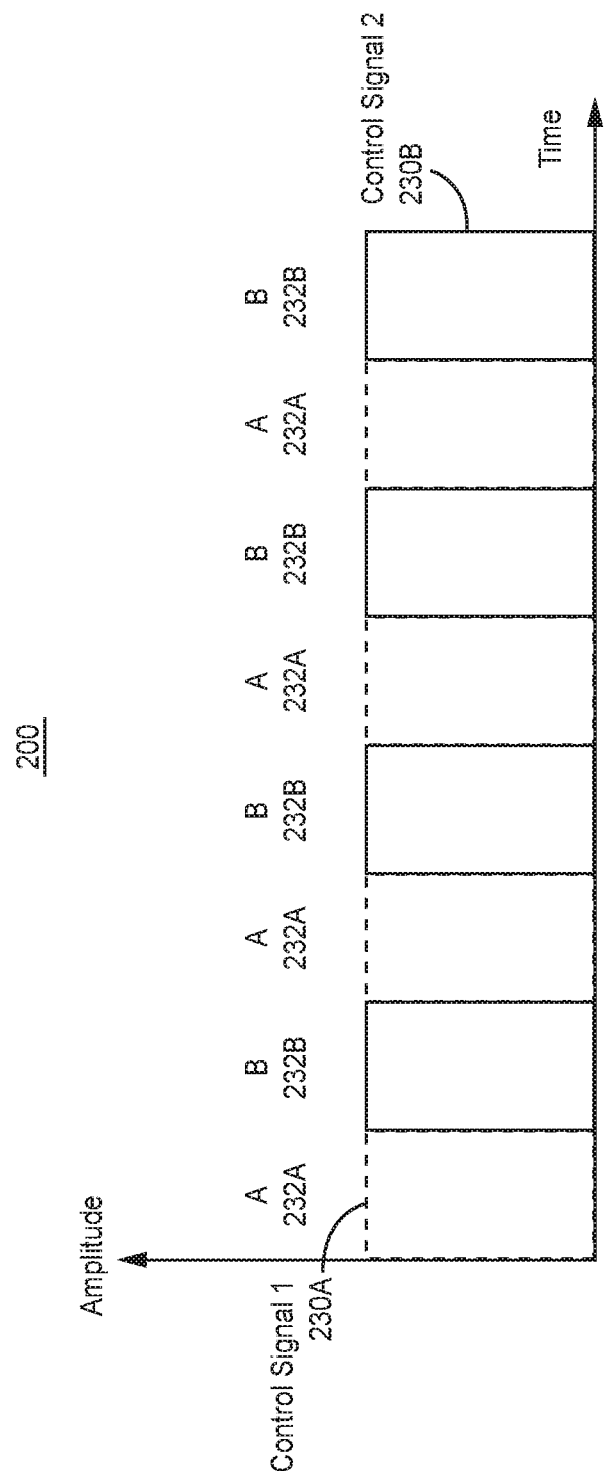
FIG. 2 illustrates one embodiment of control signals configured to be provided to a first variable optical attenuator and a second variable optical attenuator to respectively turn on and off those attenuators.

FIG. 2 illustrates one embodiment of control signals 200, e.g. generated by the processing system 125 (for example by the angular rotation calculation system 125A-1) or independent control signal generation system(s), configured to be provided to the first variable optical attenuator 112A and the second variable optical attenuator 112B to respectively turn on and off those attenuators. When a variable optical attenuator is turned on, then it provides a low level of, e.g. minimum, attenuation. When a variable optical attenuator is turned off, then it provides a high level of, e.g. maximum, attenuation.

Control signal 1 230A respectively turns on and off the first variable optical attenuator 112A. During period A 232A, the first variable optical attenuator 112A is turned on. During period B 232B, the first variable optical attenuator 112A is turned off. Correspondingly, during period B 232B, the second variable optical attenuator 112B is turned on. During period A 232A, the second variable optical attenuator 112B is turned off. Thus, when the first variable optical attenuator 112A is turned on or off, the second variable optical attenuator 112B is respectively turned off or on.

In one embodiment, period A 232A and period B 232B are equal. In another embodiment, each of period A 232A and period B 232B may be a time greater than the time the corresponding laser needs to reaching steady state, e.g. a few microsecond. In a further embodiment, the switching frequency of control signal 1 230A and control signal 2 230B is 1 MHz or less.

A first order Stokes signal takes a first, finite amount of time to reach its steady state power level after a corresponding laser pump signal is supplied to the optical resonator 102. The first order Stokes signal takes a second, finite amount of time to decay to zero power level after the corresponding laser pump signal is no longer supplied to the optical resonator 102. In one embodiment, to both ensure that a first order Stokes signal, generated by one laser pump signal, has reached steady state power level, and a first order Stokes signal, generated by the other laser pump signal, has reached substantially zero power level, measurement data is only collected, stored, and/or used, e.g. by the processing system 125, outside a guard band. The guard band is a time period, e.g. 0.001 to 100 milliseconds, that is less than period A 232A and period B 232B. However, in another embodiment, guard bands are not used.

Figure 3A:
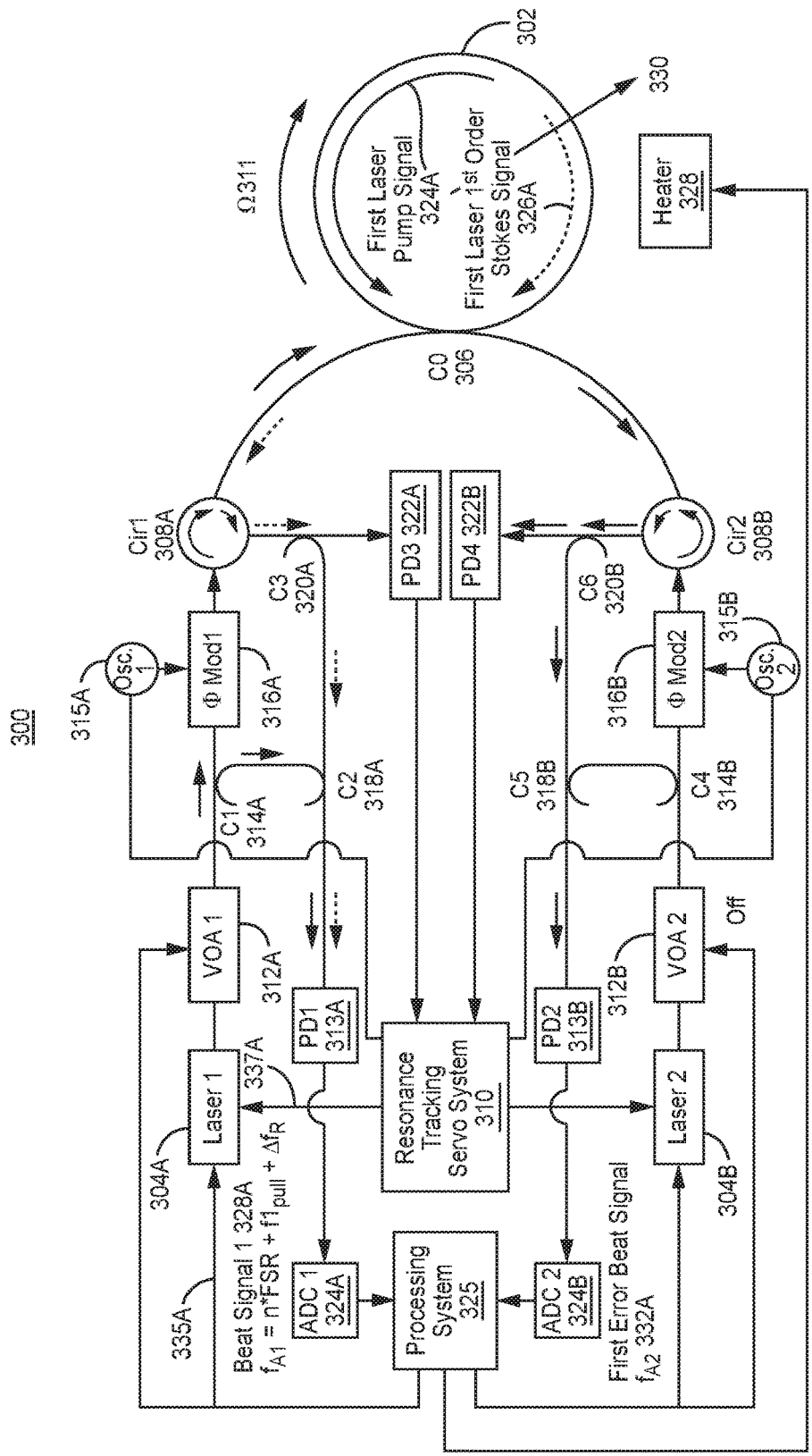
FIG. 3A illustrates one embodiment of a first mode of operation of a stimulated Brillouin scattering ring laser gyroscope with a first laser pump signal present in an optical resonator.

FIG. 3A illustrates one embodiment of a first mode of operation of the SBS ring laser gyroscope 300 with the first laser pump signal 324A present in the optical resonator 302. In the first mode of operation, during period A 232A, the first variable optical attenuator 312A substantially passes the first laser pump signal 324A, and the second optical attenuator 312B substantially blocks the second laser pump signal. In one embodiment, the first laser pump signal 324A is phase modulated by a fixed frequency by the first phase modulator 316A and the first oscillator (Osc. 1) 315A. Such phase modulation is used for tracking, e.g. using a Pound-Drever-Hall technique, a resonance in the optical resonator 302. The first phase modulator 316A may be located anywhere in the SBS ring laser gyroscope 300 after the first laser 304A and before optical resonator 302.

The first laser pump signal 324A, which has been phase modulated, is coupled into the optical resonator 302 by the first circulator 308A and the resonator coupler 306. The first laser pump signal 324A propagates counter-clockwise in the optical resonator 302.

Due to the stimulated Brillouin scattering, the first laser pump signal 324A generates a first laser first order Stokes signal 326A in the optical resonator 302. The first laser first order Stokes signal 326A propagates clockwise around the optical resonator 302. As the SBS ring laser gyroscope 300 is rotated about its input axis 330, the resonant frequency for the path of the first laser pump signal 324A changes due to the Sagnac effect.

The first laser first order Stokes signal 326A is coupled out of the optical resonator 302 through the resonator optical coupler 306, and propagates through the first optical circulator 308A, the third optical coupler 320A, and the second optical coupler 318A to be incident upon the first photodetector 313A. The first laser pump signal 314A is coupled through the first optical coupler 314A and second optical coupler 318A so that it is also incident upon the first photodetector 313A. The first photodetector 313A generates an electrical output signal that is a first beat signal (beat signal 1; having a frequency $f_{A1}$) 328A created by the first laser first order Stokes signal 326A and the first laser pump signal 314A. The frequency of the first beat signal 328A is $n*FSR+f1_{pull}+\Delta f_R$, where n is an integer defined by the ratio of (i) a difference of the frequencies of the first order Stokes signal and the corresponding pump signal to (ii) FSR, FSR is the free spectral range of the optical resonator 302, $fl_{pull}$ is an offset frequency arising from frequency pulling of the first order Stokes signal, and $\Delta f_R$ is a frequency component corresponding to the rate of angular rotation around the rotation axis 330 of the SBS ring laser gyroscope 300.

The first analog to digital converter 324A converts the first beat signal 328A from an analog electrical signal to a digital electrical signal, and is configured to provide the digital electrical signal to the processing system 326. In one embodiment, the processing system 325 stores, e.g. in the at least one database 125A-2, the digitized first beat signal 328A.

The first laser pump signal 324A is coupled out of the optical resonator 302 through the resonator optical coupler 306, and propagates through the second optical circulator 308B, the sixth optical coupler 320B, and the fifth optical coupler 318B to be incident upon the second photodetector 313B. The second photodetector 313B generates an electrical output signal corresponding to a first error beat signal (having a frequency $f_{A2}$) 332A only in the presence of a first laser second order Stokes signal (which would propagate counter clockwise in the optical resonator 302, and thus follow the same path as the first laser pump signal 324A. The first laser second order Stokes signal and the first laser pump signal 324A create, if the first laser second order Stokes signal is present, the first error beat signal 332A. The second analog to digital converter 324B digitized the analog first error beat signal, and is configured to provide the digitized first error beat signal to the processing system 325. In one embodiment, if the processing system 325, e.g. the laser power level control system 125A-3, detects the presence of a first error beat signal 332A, it is configured to communicate a first laser power level control signal 335A, to the first laser 304A, to adjust, e.g. reduces, the power of the first laser pump signal 324A in the optical resonator 302 until the first error beat signal 332A has a power level equal to a first beat signal threshold level, where the second order Stokes signal is created. In another embodiment, if the processing system 325, e.g. the laser power level control system 125A-3, detects no first error beat signal 332A, it is configured to communicate the first laser power level control signal 335A, to the first laser 304A, to adjust, e.g. increase, the power of the first laser pump signal 324A in the optical resonator 302 until the first error beat signal 332A has a power level equal to the first beat threshold level, where the second order Stokes signal is created. Alternatively, as described elsewhere herein, the power level of the first laser pump signal 324A can be adjusted using in whole or in part the first variable optical attenuator 312A controlled by the processing system 325, e.g. the laser power level control system 125A-3.

A portion of the first laser pump signal 324A also passes through the resonator optical coupler 306, the second circulator 308B and the sixth optical coupler 320B to be incident upon the fourth photodetector 322B. The fourth photodetector 322B generates an electrical output signal representative of the intensity of the first laser pump signal 324A. The output of the fourth photodetector 322B is configured to be coupled to the resonance tracking servo system 310 which is configured to receive the electrical output signal, or a first feedback signal, representative of the intensity of the first laser pump signal 324A. The resonance tracking servo system 310 is coupled to the first laser 304A, and is configured to provide a first laser frequency control signal 337A that controls the frequency of the optical signal generated by the first laser 304A. The first laser 304A, first phase modulator 316A, the first oscillator 315A, the fourth photodetector 322B, and the resonance tracking servo system 310 form a first Pound-Drever-Hall servo loop that causes the first laser 304A to change the frequency of its pump signal so that it is substantially the same as the resonant frequency of the path of the optical resonator 302 through which the first laser pump signal 324A travels.

Figure 3B:
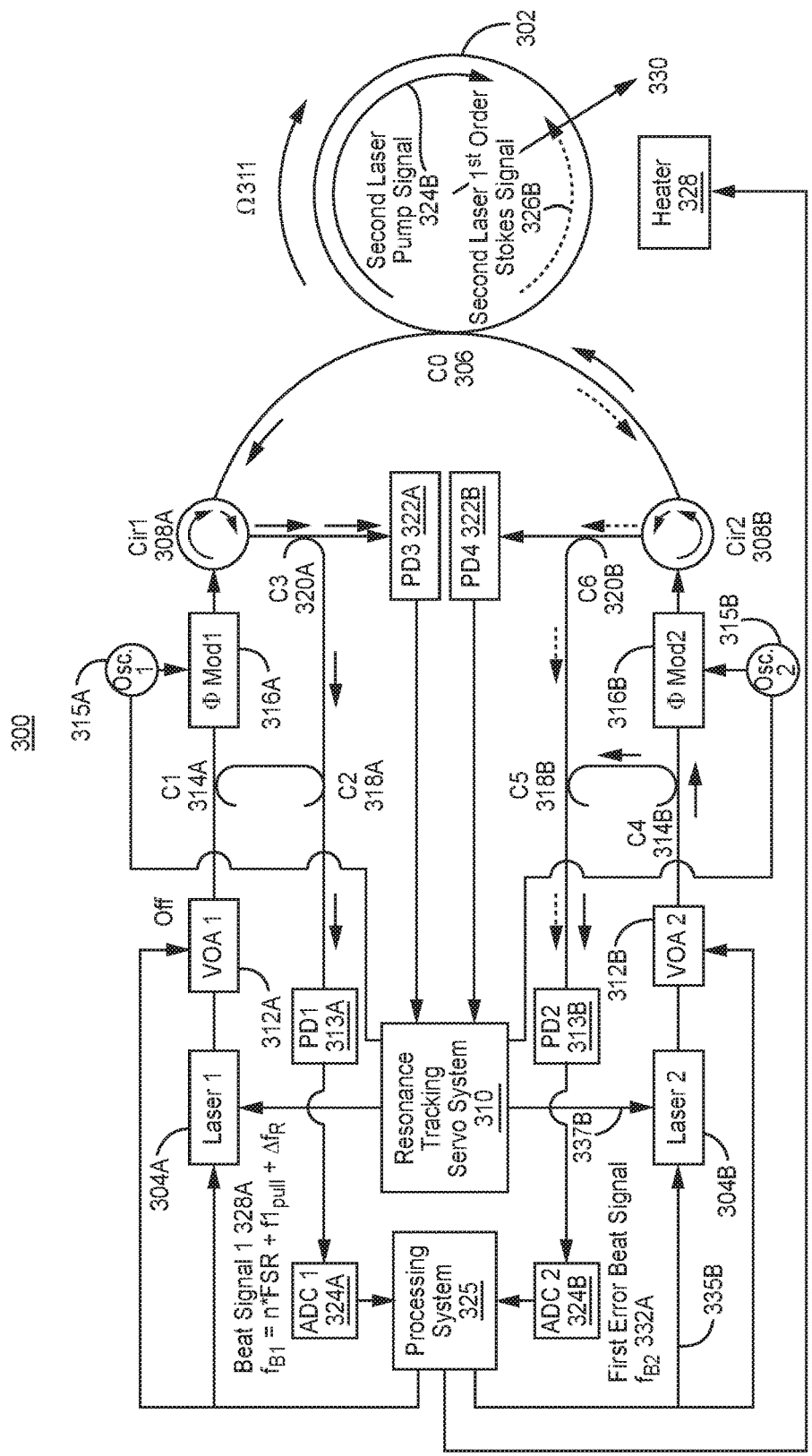
FIG. 3B illustrates one embodiment of a second mode of operation of a stimulated Brillouin scattering ring laser gyroscope with a second laser pump signal present in an optical resonator.

FIG. 3B illustrates one embodiment of a second mode of operation of the SBS ring laser gyroscope 300 with the second laser pump signal 324B present in the optical resonator 302. In the second mode of operation, during period B 232B, the second variable optical attenuator 312B substantially passes the second laser pump signal 324B, and the first optical attenuator 312A substantially blocks the first laser pump signal. In one embodiment, the second laser pump signal 324B is phase modulated by a fixed frequency by the second phase modulator 316B coupled to the second oscillator (Osc. 2) 315B. Such phase modulation is used for tracking, e.g. using a Pound-Drever-Hall technique, a resonance in the optical resonator 302. The second phase modulator 316A may be located anywhere in the SBS ring laser gyroscope 300 after the second laser 304B and before optical resonator 302.

The second laser pump signal 324B, which has been phase modulated, is coupled into the optical resonator 302 by the second circulator 308B and the resonator coupler 306. The second laser pump signal 324B propagates counterclockwise in the optical resonator 302. Due to the stimulated Brillouin scattering, the second laser pump signal 324B generates a second laser first order Stokes signal 326B in the optical resonator 302. The second laser first order Stokes signal 326B propagates counter clockwise around the optical resonator 302. As the SBS ring laser gyroscope 300 is rotated about its input axis 330, the resonant frequency for the paths of the second laser pump signal 324B changes due to the Sagnac effect.

The second laser first order Stokes signal 326B is coupled out of the optical resonator 302 through the resonator optical coupler 306, and propagates through the second optical circulator 308B, the sixth optical coupler 320B, and the fifth optical coupler 318B to be incident upon the second photodetector 313B. The second laser pump signal 314B is coupled through the fourth optical coupler 314B and fifth optical coupler 318B so that it is also incident upon the second photodetector 313B. The second photodetector 313B generates an electrical output signal that is a second beat signal, or beat signal 2, (having a frequency $f_{B2}$) 328B created by the second laser first order Stokes signal 326B and the second laser pump signal 314B. The frequency of the second beat signal 328A is $n*FSR+f2_{pull}+\Delta f_R$, where n is an integer defined by the ratio of (i) a difference of the frequencies of the first order Stokes signal and the corresponding pump signal to (ii) FSR, FSR is the free spectral range of the optical resonator 302, $f2_{pull}$ is an offset frequency arising from frequency pulling of the first Stokes signal, and $\Delta f_R$ is a frequency component corresponding to the rate of angular rotation around the rotation axis 330 of the SBS ring laser gyroscope 300.

The second analog to digital converter 324B converts the second beat signal 328B from an analog electrical signal to a digital electrical signal, and is configured to provide the digital electrical signal to the processing system 326. The processing system 325 stores, e.g. in the at least one database 125A-2, the digitized second beat signal 328A.

The second laser pump signal 324B is coupled out of the optical resonator 302 through the resonator optical coupler 306, and propagates through the first optical circulator 308B, the third optical coupler 320A, and the second optical coupler 318A to be incident upon the first photodetector 313A. The first photodetector 313A generates an electrical output signal corresponding to a second error beat signal (having a frequency $f_{B1}$) 332B only in the presence of a second laser second order Stokes signal (which would propagate clockwise in the optical resonator 302, and thus follow the same path as the second laser pump signal 324B. The second laser second order Stokes signal and the second laser pump signal 324B create, if the second laser second order Stokes signal is present, the second error beat signal 332B. The second analog to digital converter 324B digitized the analog second error beat signal, and is configured to provide the digitized second error beat signal to the processing system 325, e.g. the laser power level control system 125A-3. If the processing system 325, e.g. the laser power level control system 125A-3, detects the presence of a second error beat signal 332A, it is configured to communicate a second laser power level control signal 335B, to the second laser 304B, to adjust, e.g. reduces, the power of the second laser pump signal 324B in the optical resonator 302 until the second error beat signal 332B has a power level equal to a second beat threshold level, where the second order Stokes signal is created. In one embodiment, the first beat threshold level and the second beat threshold level may be the same. The first and second beat threshold levels correspond to the first and second laser threshold levels. In another embodiment, if the processing system 325, e.g. the laser power level control system 125A-3, detects no second error beat signal 332B, it is configured to communicate the second laser power level control signal 335B, to the second laser 304B, to adjust, e.g. increase, the output power of the second laser pump signal 324B until the second error beat signal 332B has a power level equal to the second beat threshold level (described above), where the second order Stokes signal is created. Alternatively, as described elsewhere herein, the power level of the second laser pump signal 324B can be adjusted using in whole or in part the second variable optical attenuator 312B controlled by the processing system 325, e.g. the laser power level control system 125A-3.

A portion of the second laser pump signal 324B also passes through the resonator optical coupler 306 and the third optical coupler 320A to be incident upon the third photodetector 322A. The third photodetector 322A generates an electrical output signal representative of the intensity of the second laser pump signal 324B. The output of the third photodetector 322A is configured to be coupled to the resonance tracking servo system 310 which is configured to receive the electrical output signal, or a second feedback signal, representative of the intensity of the second laser pump signal 324B. The resonance tracking servo system 310 is coupled to the second laser 304B, and is configured to provide a second laser frequency control signal 337B that controls the frequency of the optical signal generated by the second laser 304B. The second laser 304B, second phase modulator 316B, the second oscillator 315B, the third photodetector 322A, and the resonance tracking servo system 310 form a second Pound-Drever-Hall servo loop that causes the second laser 304B to change the frequency of its pump signal so that it is substantially the same as the resonant frequency of the path of the optical resonator 302 through which the second laser pump signal 324B travels.

Subsequently, the processing system 325, e.g. the angular rotation calculation system 125A-1, determines the $\Delta f_R$ which is equal to $(f_{A1}-f_{B2})/2$. By controlling the laser powers in the optical resonator 302 to be at the laser threshold level(s) at which the second order Stokes signals are created, $f1_{pull}$ and $f2_{pull}$ frequency pulling components are either very small or cancel out one another, and thus can be ignored. In another embodiment, the processing system 325, e.g. the angular rotation calculation system 125A-1, may store and average two or more measurements of each of $f_{A1}$ and $f_{B2}$. In a further embodiment, the processing system 325, e.g. the angular rotation calculation system 125A-1, also determines the angular rotation rate ($\Omega$) 111 which is equal to $(n*\lambda*\Delta f_R*P)/(4*A)$.

Figure 4:
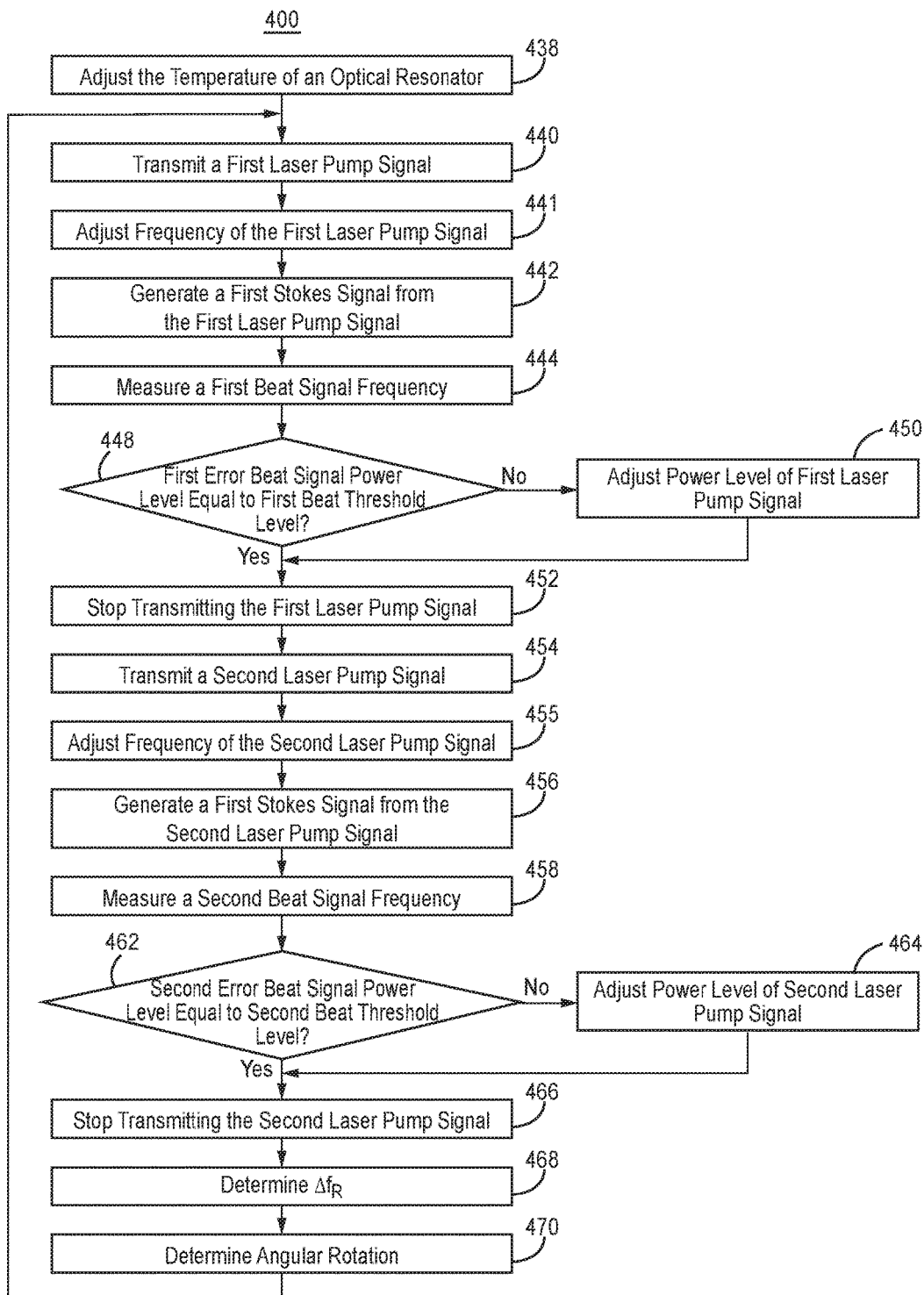
FIG. 4 illustrates one embodiment of a method of operation of a stimulated Brillouin scattering ring laser gyroscope with time division multiplexed lasers.

FIG. 4 illustrates one embodiment of a method of operation of a SBS ring laser gyroscope with time division multiplexed lasers 400. To the extent that the embodiment of method 400 shown in FIG. 4 is described herein as being implemented in the systems shown in FIGS. 1A through 3B, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner).

In one embodiment, in block 438, adjust the temperature of the optical resonator 302, e.g. with the heater 328. In block 440, transmit a first laser pump signal into the optical resonator 302, e.g. by setting the first variable optical attenuator 312A to a low level of attenuation, for example, such as minimum attenuation.

In one embodiment, in block 441, adjust a frequency of the first laser pump signal 324A, e.g. by sending the first laser frequency control signal 337A from a resonance tracking servo system 310 to the first laser 304A. In one embodiment, measure the power level of the first laser pump signal 324A, e.g. with the fourth photodetector 322B, with which to determine whether and to what extent to adjust the frequency of the first laser pump signal 324A.

In block 442, generate a first order Stokes signal from the first laser pump signal 324A, e.g. in the optical resonator 302. In block 444, measure a first beat signal frequency, e.g. with the first photodetector 313A, first analog to digital converter 324A, and the processing system 325.

In one embodiment, in block 448, determine whether a first error beat signal 332A has a signal power equal to the beat threshold power level, e.g. the first beat threshold level, where the second order Stokes signal is created. For example, the second photodetector 313B and the processing system 325 detect the existence and power level of the first error beat signal 332A.

In one embodiment, in block 450, if the first error beat signal 332A does not have a signal power equal to the first beat threshold level, then adjust the power level of the first laser pump signal 324A in the optical resonator 302 until first error beat signal 332A reaches the first beat threshold level. In another embodiment, if no first error beat signal 332A is detected, then increase, the power level of the first laser pump signal 324A in the optical resonator 302 until the first error beat signal 332A reaches the first beat threshold level. If the first error beat signal 332A exists and has a power level above the first beat threshold level, then reduce the power level of the first laser pump signal 324A in the optical resonator 302 so that the first error beat signal 332A has a power level equal to the first beat threshold level. Power level control of the first laser pump signal 324A in the optical resonator 302 can be accomplished in one of the manners described above. In block 452, stop transmitting the first laser pump signal into the optical resonator 302, e.g. by setting the first variable optical attenuator 312A to a high level of attenuation, for example, such as maximum attenuation.

In block 454, transmit a second laser pump signal into the optical resonator 302, e.g. by setting the second variable optical attenuator 312B to a low level of attenuation, for example, such as minimum attenuation. In one embodiment, in block 455, adjust a frequency of the second laser pump signal 324B, e.g. by sending the second laser frequency control signal 337B from a resonance tracking servo system 310 to the second laser B. In one embodiment, measure the power level of the second laser pump signal 324B, e.g. with the third photodetector 322A, with which to determine whether and to what extent to adjust the frequency of the second laser pump signal 324B.

In block 456, generate a first order Stokes signal from the second laser pump signal 324B, e.g. in the optical resonator 302. In block 458, measure a second beat signal frequency, e.g. with the second photodetector 313B, second analog to digital converter 324B, and the processing system 325.

In one embodiment, in block 462, determine whether a second error beat signal 332B has a signal power equal to a beat threshold power level, e.g. the second beat threshold level, where the second order Stokes signal is created. For example, the first photodetector 313A and the processing system 325 detect the existence and power level of the second error beat signal 332B.

In one embodiment, in block 464, if the second error beat signal 332B does not have a signal power equal to the second beat threshold level, then adjust the power level of the second laser pump signal 324B in the optical resonator 302 until second error beat signal 332B reaches the second beat threshold level. In another embodiment, if no second error beat signal 332B is detected, then increase, the power level of the second laser pump signal 324B in the optical resonator 302 until the second error beat signal 332B reaches the second beat threshold level. If the second error beat signal 332B exists and has a power level above the second beat threshold level, then reduce the power level of the second laser pump signal 324B in the optical resonator 302 so that the second error beat signal 332B has a power level equal to the second beat threshold level. Power level control of the second laser pump signal 324B in the optical resonator 302 can be accomplished in one of the manners described above. In block 466, stop transmitting the second laser pump signal into the optical resonator 302, e.g. by setting the first variable optical attenuator 312A to a high level of attenuation, for example, such as maximum attenuation.

Generate data representative of an angular rotation rate 311 around the input axis 327 based upon the first beat signal 328A and the second beat signal 328B. In one embodiment, in block 468, determine $\Delta f_R$. In another embodiment, in block 470, determine the angular rotation rate 311 around the input axis 327 of the optical resonator 302.

The term signals and waveforms may be used herein to refer to optical power, voltage or current signals or waveforms. Further, the term level may be used to refer to levels that are optical power, voltage or current levels.

Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a stimulated Brillouin scattering (SBS) ring laser gyroscope, comprising: a first laser configured to generate a first laser pump signal; a second laser configured to generate a second laser pump signal; a first variable optical attenuator coupled to the output of the first laser; a second variable optical attenuator coupled to the output of the second laser; an optical resonator coupled to the first variable optical attenuator and the second variable optical attenuator; an input axis parallel to a center axis of the optical resonator; wherein the first variable optical attenuator and the second variable optical attenuator are configured to alternatively, during different time periods, transmit to the optical resonator the first laser pump signal and the second laser pump signal; wherein the first laser pump signal and the second laser pump signal each generate a first order Stokes signal in the optical resonator that propagates in an opposite direction, around the optical resonator, of the corresponding first laser pump signal and the second laser pump signal; a first photodetector coupled to the optical resonator; a second photodetector coupled to the optical resonator; a third photodetector coupled to the optical resonator; a fourth photodetector couple to the optical resonator; wherein the first photodetector is configured to generate electrical signals representative of a first beat signal when the first laser pump signal propagates in optical resonator, and a second error beat signal when the second laser pump signal propagates in optical resonator; wherein the second photodetector is configured to generate an electrical signals representative of a second beat signal when the second laser pump signal propagates in optical resonator, and a first error beat signal when the first laser pump signal propagates in optical resonator; wherein the third photodetector is configured to generate a second feedback signal whose amplitude varies based upon incident power of a portion of the second laser pump signal that exits the optical resonator; wherein the fourth photodetector is configured to generate a first feedback signal whose amplitude varies based upon incident power of a portion of the first laser pump signal that exits the optical resonator; a resonance tracking servo system, coupled to the first laser, the second laser, the third photo detector, and the fourth photo detector; a processing system coupled to the first photodetector, the second photodetector, the first variable optical attenuator and the second variable optical attenuator; wherein the resonance tracking servo system is configured to alter the frequency of the first laser pump signal and the second laser pump signal based upon respectively the first feedback signal and the second feedback signal; wherein the processing system is configured to alternatively receive the first beat signal and the second beat signal; and wherein the processing system is configured to generate data representative of an angular rotation rate around the input axis based upon the first beat signal and the second beat signal.

Example 2 includes the stimulated Brillouin scattering (SBS) ring laser gyroscope of Example 1, wherein the processing system is configured to alternatively receive the first error beat signal and the second error beat signal; and wherein the processing system configured to adjust the power levels in the optical resonator of the first laser pump signal and the second laser pump signal based upon respectively the first error beat signal and the second error beat signal.

Example 3 includes the stimulated Brillouin scattering (SBS) ring laser gyroscope of Example 2, wherein the processing system is coupled to the first laser and the second laser; and wherein the power levels of the first laser and the second laser are controlled by the processing system.

Example 4 includes the stimulated Brillouin scattering (SBS) ring laser gyroscope of any of Examples 2-3, wherein the processing system is configured to adjust the power levels of each of the first laser pump signal and the second laser pump signal in the optical resonator to at least one laser threshold level where the second order Stokes signal is created.

Example 5 includes the stimulated Brillouin scattering (SBS) ring laser gyroscope of any of Examples 1-4, wherein the processing system comprises: a processor; a memory, coupled to the processor, comprising: an angular rotation calculation system; and at least one database.

Example 6 includes the stimulated Brillouin scattering (SBS) ring laser gyroscope of any of Examples 4-5, wherein the memory further comprises a laser power level control system.

Example 7 includes the stimulated Brillouin scattering (SBS) ring laser gyroscope of any of Examples 1-6, wherein the data, representative of the rotation about the input axis, is dependent upon the difference between the frequencies of the first beat signal and the second beat signal.

Example 8 includes a method, comprising: transmitting a first laser pump signal to an optical resonator; adjusting a frequency of the first laser pump signal; generating a first order Stokes signal from the first laser pump signal in an optical resonator; measuring a first beat signal frequency; ceasing transmission of the first laser pump signal to the optical resonator; transmitting a second laser pump signal to the optical resonator; adjusting a frequency of the second laser pump signal; generating a first order Stokes signal from the second laser pump signal in the optical resonator; and measuring a second beat signal frequency; ceasing transmission of the second laser pump signal to the optical resonator.

Example 9 includes the method of Example 8, further comprising generating data representative of an angular rotation rate around an input axis of the optical resonator based upon the first beat signal and the second beat signal.

Example 10 includes the method of Example 9, wherein comprising generating the data representative of the angular rotation rate around the input axis based upon the first beat signal and the second beat signal comprises determining $\Delta f_R$.

Example 11 includes the method of any of Examples 9-10, wherein comprising generating the data representative of the angular rotation rate around the input axis based upon the first beat signal and the second beat signal comprises determining the angular rotation rate around the input axis.

Example 12 includes the method of any of Examples 8-11, further comprising: determining whether a first error beat signal power level is equal to a first beat threshold level; if the first error beat signal is not equal to the first beat threshold level, adjusting the power level of the first laser pump signal in the optical resonator so that the first error beat signal equals the first beat threshold level; determining whether a second error beat signal is equal to a second beat threshold level; and if the second error beat signal is not equal to the second beat threshold level, adjusting the power level of the second laser pump signal in the optical resonator so that the second error beat signal equals the second beat threshold level.

Example 13 includes the method of any of Examples 8-12, further comprising adjusting the temperature of the optical resonator.

Example 14 includes the method of any of Examples 8-13, wherein adjusting the frequency of the first laser pump signal comprises adjusting the frequency of the first laser pump signal based upon the power level of the first laser pump signal coupled from the optical resonator; and wherein adjusting the frequency of the second laser pump signal comprises adjusting the frequency of the second laser pump signal based upon the power level of the second laser pump signal coupled from the optical resonator.

Example 15 includes a system, comprising: a vehicle; wherein the vehicle includes one or more stimulated scattering Brillouin ring laser gyroscopes; and wherein at least one stimulated Brillouin scattering ring laser gyroscope, comprising: a first laser configured to generate a first laser pump signal; a second laser configured to generate a second laser pump signal; a first variable optical attenuator coupled to the output of the first laser; a second variable optical attenuator coupled to the output of the second laser; an optical resonator coupled to the first variable optical attenuator and the second variable optical attenuator; an input axis parallel to a center axis of the optical resonator; wherein the first variable optical attenuator and the second variable optical attenuator are configured to alternatively, during different time periods, transmit to the optical resonator the first laser pump signal and the second laser pump signal; wherein the first laser pump signal and the second laser pump signal each generate a first order Stokes signal in the optical resonator that propagates in an opposite direction, around the optical resonator, of the corresponding first laser pump signal and the second laser pump signal; a first photodetector coupled to the optical resonator; a second photodetector coupled to the optical resonator; a third photodetector coupled to the optical resonator; a fourth photodetector couple to the optical resonator; wherein the first photodetector is configured to generate electrical signals representative of a first beat signal when the first laser pump signal propagates in optical resonator, and a second error beat signal when the second laser pump signal propagates in optical resonator; wherein the second photodetector is configured to generate an electrical signals representative of a second beat signal when the second laser pump signal propagates in optical resonator, and a first error beat signal when the first laser pump signal propagates in optical resonator; wherein the third photodetector is configured to generate a second feedback signal whose amplitude varies based upon incident power of a portion of the second laser pump signal that exits the optical resonator; wherein the fourth photodetector is configured to generate a first feedback signal whose amplitude varies based upon incident power of a portion of the first laser pump signal that exits the optical resonator; a resonance tracking servo system, coupled to the first laser, the second laser, the third photo detector, and the fourth photo detector; a processing system coupled to the first photodetector, the second photodetector, the first variable optical attenuator and the second variable optical attenuator; wherein the resonance tracking servo system is configured to alter the frequency of the first laser pump signal and the second laser pump signal based upon respectively the first feedback signal and the second feedback signal; wherein the processing system is configured to alternatively receive the first beat signal and the second beat signal; and wherein the processing system is configured to generate data representative of an angular rotation rate around the input axis based upon the first beat signal and the second beat signal.

Example 16 includes the system of Example 15, wherein the processing system is coupled to the first laser and the second laser; and wherein the power levels of the first laser and the second laser are controlled by the processing system.

Example 17 includes the system of Example 16, wherein the processing system configured to adjust the power levels of each of the first laser pump signal and the second laser pump signal to at least one laser threshold level where the second order Stokes signal is created.

Example 18 includes the system of any of Examples 15-17, wherein the processing system comprises: a processor; a memory, coupled to the processor, comprising: an angular rotation calculation system; and at least one database.

Example 19 includes the system of Example 18, wherein the memory further comprises a laser power level control system.

Example 20 includes the system of any of Examples 18-19, wherein the processing system is configured to alternatively receive the first error beat signal and the second error beat signal; wherein the processing system is configured to adjust the power levels of the first laser pump signal and the second laser pump signal based upon respectively the first error beat signal and the second error beat signal; and wherein the processing system is coupled to the first laser and the second laser.

What is claimed is:
1. A stimulated Brillouin scattering (SBS) ring laser gyroscope, comprising:
  a first laser configured to generate a first laser pump signal;
  a second laser configured to generate a second laser pump signal;
  a first variable optical attenuator coupled to the output of the first laser;
  a second variable optical attenuator coupled to the output of the second laser;
  an optical resonator coupled to the first variable optical attenuator and the second variable optical attenuator;
  an input axis parallel to a center axis of the optical resonator;
  wherein the first variable optical attenuator and the second variable optical attenuator are configured to alternatively, during different time periods, transmit to the optical resonator the first laser pump signal and the second laser pump signal;
  wherein the first laser pump signal and the second laser pump signal each generate a first order Stokes signal in the optical resonator that propagates in an opposite direction, around the optical resonator, of the corresponding first laser pump signal and the second laser pump signal;
  a first photodetector coupled to the optical resonator;
  a second photodetector coupled to the optical resonator;
  a third photodetector coupled to the optical resonator;
  a fourth photodetector couple to the optical resonator;
  wherein the first photodetector is configured to generate electrical signals representative of a first beat signal when the first laser pump signal propagates in optical resonator, and a second error beat signal when the second laser pump signal propagates in optical resonator;
  wherein the second photodetector is configured to generate an electrical signals representative of a second beat signal when the second laser pump signal propagates in optical resonator, and a first error beat signal when the first laser pump signal propagates in optical resonator;
  wherein the third photodetector is configured to generate a second feedback signal whose amplitude varies based upon incident power of a portion of the second laser pump signal that exits the optical resonator;
  wherein the fourth photodetector is configured to generate a first feedback signal whose amplitude varies based upon incident power of a portion of the first laser pump signal that exits the optical resonator;
  a resonance tracking servo system, coupled to the first laser, the second laser, the third photo detector, and the fourth photo detector;
  a processing system coupled to the first photodetector, the second photodetector, the first variable optical attenuator and the second variable optical attenuator;
  wherein the resonance tracking servo system is configured to alter the frequency of the first laser pump signal and the second laser pump signal based upon respectively the first feedback signal and the second feedback signal;

wherein the processing system is configured to alternatively receive the first beat signal and the second beat signal; and wherein the processing system is configured to generate data representative of an angular rotation rate around the input axis based upon the first beat signal and the second beat signal.

2. The stimulated Brillouin scattering (SBS) ring laser gyroscope of claim 1, wherein the processing system is configured to alternatively receive the first error beat signal and the second error beat signal; and wherein the processing system configured to adjust the power levels in the optical resonator of the first laser pump signal and the second laser pump signal based upon respectively the first error beat signal and the second error beat signal.

3. The stimulated Brillouin scattering (SBS) ring laser gyroscope of claim 2, wherein the processing system is coupled to the first laser and the second laser; and wherein the power levels of the first laser and the second laser are controlled by the processing system.

4. The stimulated Brillouin scattering (SBS) ring laser gyroscope of claim 2, wherein the processing system is configured to adjust the power levels of each of the first laser pump signal and the second laser pump signal in the optical resonator to at least one laser threshold level where the second order Stokes signal is created.

5. The stimulated Brillouin scattering (SBS) ring laser gyroscope of claim 4, wherein the memory further comprises a laser power level control system.

6. The stimulated Brillouin scattering (SBS) ring laser gyroscope of claim 1, wherein the processing system comprises:

a processor;
a memory, coupled to the processor, comprising:
an angular rotation calculation system; and
at least one database.

7. The stimulated Brillouin scattering (SBS) ring laser gyroscope of claim 1, wherein the data, representative of the rotation about the input axis, is dependent upon the difference between the frequencies of the first beat signal and the second beat signal.

8. A system, comprising:
a vehicle;
wherein the vehicle includes one or more stimulated scattering Brillouin ring laser gyroscopes; and
wherein at least one stimulated Brillouin scattering ring laser gyroscope, comprising:
a first laser configured to generate a first laser pump signal;
a second laser configured to generate a second laser pump signal;
a first variable optical attenuator coupled to the output of the first laser;
a second variable optical attenuator coupled to the output of the second laser;
an optical resonator coupled to the first variable optical attenuator and the second variable optical attenuator;
an input axis parallel to a center axis of the optical resonator;
wherein the first variable optical attenuator and the second variable optical attenuator are configured to alternatively, during different time periods, transmit to the optical resonator the first laser pump signal and the second laser pump signal;
wherein the first laser pump signal and the second laser pump signal each generate a first order Stokes signal in the optical resonator that propagates in an opposite direction, around the optical resonator, of the corresponding first laser pump signal and the second laser pump signal;

a first photodetector coupled to the optical resonator;
a second photodetector coupled to the optical resonator;
a third photodetector coupled to the optical resonator;
a fourth photodetector couple to the optical resonator;
wherein the first photodetector is configured to generate electrical signals representative of a first beat signal when the first laser pump signal propagates in optical resonator, and a second error beat signal when the second laser pump signal propagates in optical resonator;

wherein the second photodetector is configured to generate an electrical signals representative of a second beat signal when the second laser pump signal propagates in optical resonator, and a first error beat signal when the first laser pump signal propagates in optical resonator;

wherein the third photodetector is configured to generate a second feedback signal whose amplitude varies based upon incident power of a portion of the second laser pump signal that exits the optical resonator;

wherein the fourth photodetector is configured to generate a first feedback signal whose amplitude varies based upon incident power of a portion of the first laser pump signal that exits the optical resonator;

a resonance tracking servo system, coupled to the first laser, the second laser, the third photo detector, and the fourth photo detector;

a processing system coupled to the first photodetector, the second photodetector, the first variable optical attenuator and the second variable optical attenuator;

wherein the resonance tracking servo system is configured to alter the frequency of the first laser pump signal and the second laser pump signal based upon respectively the first feedback signal and the second feedback signal;

wherein the processing system is configured to alternatively receive the first beat signal and the second beat signal; and wherein the processing system is configured to generate data representative of an angular rotation rate around the input axis based upon the first beat signal and the second beat signal.

9. The system of claim 8, wherein the processing system is coupled to the first laser and the second laser; and wherein the power levels of the first laser and the second laser are controlled by the processing system.

10. The system of claim 9, wherein the processing system configured to adjust the power levels of each of the first laser pump signal and the second laser pump signal to at least one laser threshold level where the second order Stokes signal is created.

11. The system of claim 8, wherein the processing system comprises:

a processor;
a memory, coupled to the processor, comprising:
an angular rotation calculation system; and
at least one database.

12. The system of claim 11, wherein the memory further comprises a laser power level control system.

13. The system of claim 11, wherein the processing system is configured to alternatively receive the first error beat signal and the second error beat signal;

wherein the processing system is configured to adjust the power levels of the first laser pump signal and the second laser pump signal based upon respectively the first error beat signal and the second error beat signal; and wherein the processing system is coupled to the first laser and the second laser.

* * * * *